US011756214B2

(12) United States Patent
Weinkove et al.

(10) Patent No.: US 11,756,214 B2
(45) Date of Patent: Sep. 12, 2023

(54) METHOD AND APPARATUS FOR TRACKING NEMATODE WORMS

(71) Applicant: Magnitude Biosciences Ltd., Sedgefield (GB)

(72) Inventors: David Weinkove, Sedgefield (GB); Christopher D. Saunter, Sedgefield (GB); Bhupinder Virk, Sedgefield (GB); Craig Manning, Sedgefield (GB)

(73) Assignee: Magnitude Biosciences Ltd., Sedgefield (GB)

( * ) Notice: Subject to any disclaimer, the term of this patent is extended or adjusted under 35 U.S.C. 154(b) by 228 days.

(21) Appl. No.: 17/286,167

(22) PCT Filed: Sep. 17, 2019

(86) PCT No.: PCT/GB2019/052601
§ 371 (c)(1),
(2) Date: Apr. 16, 2021

(87) PCT Pub. No.: WO2020/079391
PCT Pub. Date: Apr. 23, 2020

(65) Prior Publication Data
US 2021/0358134 A1 Nov. 18, 2021

(30) Foreign Application Priority Data
Oct. 18, 2018 (GB) .................................. 1816991

(51) Int. Cl.
*G06T 7/246* (2017.01)
*G06T 7/254* (2017.01)
*G06T 7/00* (2017.01)

(52) U.S. Cl.
CPC ............ *G06T 7/248* (2017.01); *G06T 7/0016* (2013.01); *G06T 7/254* (2017.01);
(Continued)

(58) Field of Classification Search
CPC ....... G06T 7/0016; G06T 7/136; G06T 7/194; G06T 7/20; G06T 7/248; G06T 7/254;
(Continued)

(56) References Cited

U.S. PATENT DOCUMENTS 8,809,617 B2   8/2014  Pak et al.
8,961,877 B2   2/2015  Yanik et al.
(Continued)

FOREIGN PATENT DOCUMENTS

CN   104484876 A   4/2015
CN   105761244 A   7/2016

OTHER PUBLICATIONS

Geng et al. "Automatic tracking, feature extraction and classification of C. elegans phenotypes." IEEE transactions on biomedical engineering 51.10 (2004): 1811-1820. (Year: 2004).*
(Continued)

*Primary Examiner* — Katrina R Fujita
(74) *Attorney, Agent, or Firm* — Quarles & Brady LLP

(57) ABSTRACT

A method for tracking movement of nematode worms comprises: (i) providing a plurality of worms on a translucent substrate; (ii) obtaining a first image of a field of view including the plurality of worms by transmission imaging; (iii) obtaining a first difference image of the plurality of worms corresponding to an intensity difference between said first image and a background image of the field of view; (iv) repeating the following steps (a) to (d) a plurality of N times, for n=1 to N: (a) determining, from the first difference image, an nth pixel corresponding to a maximum intensity difference; (b) selecting, from the first difference image, an nth block of pixels comprising the selected nth pixel; (c) determining a coordinate associated with the selected nth block of pixels; and (d) updating said first difference image by setting each pixel of said nth block of pixels in said first
(Continued)

difference image to a value corresponding to a zero or low intensity difference; (v) obtaining a sequence of M subsequent images of the field of view by transmission imaging; and (vi) repeating the following steps (f) and (g) for each of the M subsequent images, for m=2 to m=M+1: (f) obtaining an mth difference image of the plurality of worms corresponding to an intensity difference between the mth subsequent image and said background image; and (g) repeating the following steps a plurality of N times, for n=1 to n=N: determining, from the mth difference image, an nth pixel corresponding to a maximum intensity difference or a centre of the intensity difference distribution of a trial block of pixels positioned at the determined coordinate associated with the corresponding nth selected block of pixels of the (m−1)th difference image; selecting an nth block of pixels of said mth difference image, said nth block of pixels comprising the determined nth pixel; and determining a coordinate associated with the selected nth block of pixels of said mth difference image.

20 Claims, 6 Drawing Sheets

(52) U.S. Cl.
CPC ............... *G06T 2207/10016* (2013.01); *G06T 2207/20224* (2013.01); *G06T 2207/30004* (2013.01); *G06T 2207/30168* (2013.01)

(58) Field of Classification Search
CPC . G06T 2207/10016; G06T 2207/20224; G06T 2207/30004; G06T 2207/30168
See application file for complete search history.

(56) References Cited

U.S. PATENT DOCUMENTS

| | | | |
|---|---|---|---|
| 9,734,575 B2 | 8/2017 | Akoulitchev et al. | |
| 2006/0191023 A1 | 8/2006 | Gill et al. | |
| 2013/0034272 A1* | 2/2013 | Thomas | G06V 20/69 382/107 |
| 2014/0286529 A1* | 9/2014 | Sprenger | G06V 20/69 382/103 |
| 2017/0107470 A1 | 4/2017 | Fang-Yen | |
| 2017/0312748 A1 | 11/2017 | Cornaglia et al. | |
| 2018/0011084 A1* | 1/2018 | Fois | G01N 33/5085 |
| 2018/0033128 A1* | 2/2018 | Sobieranski | G03H 1/0866 |
| 2021/0004564 A1* | 1/2021 | Perni | G06V 20/695 |

OTHER PUBLICATIONS

Kowalski et al. "A simultaneous localization and tracking method for a worm tracking system." International Journal of Applied Mathematics and Computer Science 24.3 (2014): 599-609. (Year: 2014).*
Lange et al. "A microfluidic shadow imaging system for the study of the nematode *Caenorhabditis elegans* in space." Sensors and Actuators B: Chemical 107.2 (2005): 904-914. (Year: 2005).*
Roussel et al. "A computational model for C. elegans locomotory behavior: application to multiworm tracking." IEEE transactions on biomedical engineering 54.10 (2007): 1786-1797. (Year: 2007).*
Scigajlo, Alexander. Automated Nematode Tracking System. Dissertation McMaster University. 2016. (Year: 2016).*
Comaniciu et al., Kernel-Based Object Tracking, IEEE Transactions on Pattern Analysis and Machine Intelligence, 2003, 25(5):564-577.
Harris et al., A Combined Corner and Edge Detector, Proceedings of the Alvey Vision Conference, 1988, pp. 147-151.
Husson et al., Keeping Track of Worm Trackers, WormBook: The Online Review of C. Elegans Biology, 2012, pp. 1-17.
Tskovits et al., A Multi-Animal Tracker for Studying Complex Behaviors, BMC Biology, 2017, 15(1):1-16.
Miathew et al., WormScan: A Technique for High-Throughput Phenotypic Analysis of Caenorhabditis elegans, PloS One, 2012, 7(3):e33483, 11 pages.
Mondal et al., Large-Scale Microfluidics Providing High-Resolution and High-Throughput Screening of Caenorhabditis elegans Poly-Glutamine Aggregation Model, Nature Communications, 2016, 7(1):1-11.
Parag et al., Tracking Multiple Neurons on Worm Images, In Medical Imaging 2013: Image Processing, Proc. of SPIE, vol. 8669, pp. 86692P-1 thru 86692P-6.
Roussel et al., A Computational Model for C. elegans Locomotory Behavior: Application to Multiworm Tracking, IEEE Transactions on Biomedical Engineering, 2007, 54(10):1786-1797.
Singh et al., Automated Image-Based Phenotypic Screening for High-Throughput Drug Discovery, In 2009 22nd IEEE International Symposium on Computer-Based Medical Systems, pp. 1-8.
Stroustrup et al., The Caenorhabditis elegans Lifespan Machine, Nature Methods, 2013, 10(7):665-670.
Swierczek et al., High-Throughput Behavioral Analysis in C. elegans, Nature Methods, 2011, 8(7):592-598.
UK Intellectual Property Office, Combined Search and Examination Report, Application No. GB1816991.2, dated Apr. 18, 2019, 5 pages.
PCT International Search Report and Written Opinion, PCT/GB2019/052601, dated Nov. 14, 2019, 15 pages.

* cited by examiner

I_1

I_max

I_max − I_1

I_min

I_max − I_min

METHOD AND APPARATUS FOR TRACKING NEMATODE WORMS

CROSS REFERENCE TO RELATED APPLICATIONS

This application represents the U.S. national stage entry of International Application No. PCT/GB2019/052601 filed Sep. 17, 2019, which claims priority to United Kingdom Patent Application No. 1816991.2 filed Oct. 18, 2018, the disclosures of which are incorporated herein by reference in their entirety and for all purposes.

FIELD OF THE INVENTION

The present invention relates to a method and apparatus for tracking nematode worms, and relates particularly, but not exclusively, to a method and apparatus for efficiently monitoring movement of large numbers of nematode worms, in particular *Caenorhabditis elegans*.

BACKGROUND

*Caenorhabditis elegans* is a model species of nematode or roundworm with a lifespan of only a few weeks. It has been found to be well-suited to studies of the effects of genes, drugs and environmental conditions on ageing. Some studies monitor the effect of various factors on the lifespan of the worms. However, further insights can be gained by studying the movement of the worms, including measuring the length of time, or 'healthspan', for which the worms stay moving. One approach is to monitor how the worms slow down as they age.

Measuring the decline in movement of nematode worms may be carried out by imaging the worms at regular time intervals, and analysing the images to measure the movement of the worms as a function of time. While this may be feasible for small numbers of worms, known techniques do not readily scale to large numbers of worms. For efficient screening of the effect of novel mutations, conditions or compounds on ageing, large cohort sizes and multiple observations over several weeks are required. One problem is the large quantity and the complexity of image data generated, requiring extensive data processing and storage resources. Other problems include the considerable requirements on space and energy consumption, and expense.

Embodiments of the present invention seek to overcome at least one disadvantage of the prior art.

STATEMENTS OF INVENTION

According to a first aspect of the invention, there is provided a method for tracking movement of nematode worms, the method comprising:
(i) providing a plurality of worms on a translucent substrate;
(ii) obtaining a first image of a field of view including the plurality of worms by transmission imaging;
(iii) obtaining a first difference image of the plurality of worms corresponding to an intensity difference between said first image and a background image of the field of view;
(iv) repeating the following steps (a) to (d) a plurality of N times, for n=1 to N:
  (a) determining, from the first difference image, an nth pixel corresponding to a maximum intensity difference;
  (b) selecting, from the first difference image, an nth block of pixels comprising the selected nth pixel;
  (c) determining a coordinate associated with the selected nth block of pixels; and
  (d) updating said first difference image by setting each pixel of said nth block of pixels in said first difference image to a value corresponding to a zero or low intensity difference;
(v) obtaining a sequence of M subsequent images of the field of view by transmission imaging; and
(vi) repeating the following steps (f) and (g) for each of the M subsequent images, for m=2 to m=M+1:
  (f) obtaining an mth difference image of the plurality of worms corresponding to an intensity difference between the mth subsequent image and said background image; and
  (g) repeating the following steps a plurality of N times, for n=1 to n=N:
    determining, from the mth difference image, an nth pixel corresponding to a maximum intensity difference or a centre of the intensity difference distribution of a trial block of pixels positioned at the determined coordinate associated with the corresponding nth selected block of pixels of the (m−1)th difference image;
    selecting an nth block of pixels of said mth difference image, said nth block of pixels comprising the determined nth pixel; and
    determining a coordinate associated with the selected nth block of pixels of said mth difference image.

Advantageously, the above method enables very large numbers of worms to be tracked efficiently. Tracking a plurality of worms over a reasonable period of time generates a large quantity of image data which is difficult to export in real-time for remote analysis. However, the analysis required may be too complex to be performed locally, for example at a camera or computer controlling an image sensor used for obtaining the images. In the method of the present invention, the nth selected block of pixels of the first difference image may be considered as a sub-image of a 'candidate' worm (i.e. a portion of the first difference image which may subsequently be determined to include an image of a worm). The determined coordinate associated with the nth selected block of pixels represents the position of the nth candidate worm. Each of the N candidate worms is 'tracked' through the sequence of M subsequent images, generating N further selected blocks of pixels or sub-images and associated coordinates of the candidate worms for each of the M subsequent images. These steps do not require complex processing to determine whether each candidate worm is actually a worm or some other image artefact, and may therefore be adapted for implementation locally, for example by a computer directly controlling an image sensor or camera used to obtain the images, and/or in real time.

Further data processing to determine whether each of the 'candidate' worms is a worm may optionally be performed using only the N selected blocks of pixels of the first difference image, and/or the N selected blocks of pixels of any of the M subsequent difference images. These sets of sub-images may represent a much smaller quantity of data than the original difference images from which they were selected. Thus the method of the present invention may reduce the quantity of data to be stored, transmitted and/or analysed. Data compression factors greater than 100 may be achieved, while losslessly preserving image data in the regions around the candidate worms, i.e. in the selected blocks of pixels. Thus the method of the present invention is adapted for use in a distributed data processing system in which a local computer, connected to a camera or image sensor for imaging the worms, is used to 'compress' the data as described above, and a remote computer is used for more complex further processing of the 'compressed' data.

In addition, the method of the present invention may enable a relatively low-specification imaging system to be used for imaging the worms, while still enabling accurate identification and tracking, which may further reduce expense and/or space occupied by an apparatus configured for performing the method.

In some embodiments, said background image is determined from a plurality of images of said field of view obtained by transmission imaging, wherein each pixel of said background image is assigned a value representative of the highest intensity values of the pixels having the same position in the plurality of images.

Advantageously, this feature enables background images to be obtained with the worms 'in situ' on the translucent substrate, leading to improved background subtraction. By using a value representative of the highest intensity values for each pixel over a plurality of images, a background intensity value may be obtained for each pixel in the absence of a worm at that location. This is based on the assumption that the worms move around sufficiently so that most individual pixels are worm-free (i.e. registering a high or worm-free intensity value) in at least one of the plurality of images. In some embodiments, each pixel of the background image is assigned a value corresponding to an average over a number of the highest intensity values recorded for the corresponding pixel over the plurality of images, excluding the absolute highest intensity value. This may help to reject outlying values and reduce noise.

Said plurality of images may be obtained over a period of time longer than 4 seconds.

Based on typical movement of young, healthy worms, this is sufficient time for most worms to move away from their respective starting positions, so that, for each pixel of the background image, the plurality of images used to determine the background image comprises at least one image which is worm-free for that pixel. However, to ensure sufficient movement of slower worms from their starting positions, the plurality of images used to determine the background image may be obtained over a longer period of time, for example, 2 minutes or longer.

Said plurality of images comprise at least some of said sequence of M subsequent images.

Using the M subsequent images, which are also used for tracking the worms, data collection may be more efficient. Alternative, the plurality of images used for determining the background image may be obtained prior to the M subsequent images. This may speed up processing of the first image and M subsequent images, for example, for processing in real time.

In some embodiments, the step of selecting, from the first difference image, an nth block of pixels comprising the selected nth pixel, further comprises:

determining a position of a centre of the intensity difference distribution of an initial block of pixels comprising said selected nth pixel;

wherein said nth block of pixels is centred on the position of said centre of the intensity difference distribution of the initial block of pixels.

The coordinate associated with the nth block of pixels of the first difference image is used for locating the same candidate worm in the second (m=2) difference image. Accordingly, centring the nth block of pixels on a centre of the intensity difference distribution of an initial block of pixels may improve the positioning of the nth block of pixels relative to the candidate worm. The size of the nth block of pixels is chosen so that it typically covers the whole extent of a single worm, and may therefore be larger than the size of the initial block of pixels, which is used for determining the position of the centre of the intensity difference distribution in the vicinity of the nth selected pixel having a maximum intensity difference.

Said centre of the intensity difference distribution of said initial block of pixels may be a centre-of-mass (e.g. a thresholded centre-of-mass) of the intensity difference distribution or a centre obtained by fitting a function (e.g. a Gaussian function or a polynomial function) to the intensity difference distribution.

The nth block of pixels may have a predetermined size which is the same for all n.

Said predetermined size may be selected so that each nth block of pixels typically contains at most one worm.

Said predetermined size may correspond to less than 3 mm by 3 mm in the field of view.

Said centre of the intensity difference distribution of said trial block of pixels may be a centre-of-mass (e.g. a thresholded centre-of-mass) of the intensity difference distribution of said trial block of pixels, or a centre obtained by fitting a function (e.g. a Gaussian function or a polynomial function) to the intensity difference distribution of said trial block of pixels.

Advantageously, selecting N blocks of pixels of small area, rather than retaining the whole first difference image of the field of view, reduces the processing and/or memory resources required for transmission, further analysis and/or storage of the image data.

In some embodiments, in said step of determining, from the mth difference image, an nth pixel corresponding to a maximum intensity difference or a centre of the intensity difference distribution of a trial block of pixels positioned at the determined coordinate associated with the corresponding nth selected block of pixels of the (m−1)th difference image, said trial block of pixels has the same or greater dimensions as the corresponding nth selected block of pixels of the (m−1)th difference image.

The candidate worm, if indeed a worm, may have moved between the (m−1)th and mth images. The trial block of pixels of the mth difference image is used to locate the candidate worm in the mth difference image relative to its position in the (m−1)th image and may therefore have a greater area to take account of possible displacement of the worm. If the time between images is sufficiently small, displacement of the worms will be correspondingly small so that the trial block of pixels may correspond exactly in size and position to the corresponding nth selected block of pixels of the (m−1)th difference image.

In said step of selecting an nth block of pixels of the mth difference image, said nth block of pixels of said mth difference image may be centred on said nth pixel corresponding to said maximum intensity difference or said centre of the intensity difference distribution of said trial block of pixels.

The position of nth block of the pixels, representing the position of a candidate worm, is thereby updated successively for each of the M subsequent images, thereby tracking movement of the worm.

Said M subsequent images may be separated by a period of time of less than 1 second and/or greater than 0.1 seconds.

Shorter periods of time between subsequent images enable more accurate tracking of a candidate worm from one difference image to the next, while longer periods of time reduce the data processing/storage burden. The M subsequent images may be spaced at regular time intervals.

Said first image corresponds to an average over two or more images of the field of view obtained by transmission imaging.

This may help to reduce noise, thereby reducing errors in the selection of candidate worm images and/or the subsequent analysis of these to determine whether a candidate is indeed a worm.

N may be greater than 1.5 times the number of worms provided on the translucent substrate.

This may ensure that most or all of the worms are identified and tracked. The initial selection of N candidate worms and tracking of those candidates does not involve determining whether those candidates are actually worms rather than some other image artefact. This reduces the processing required for selection and tracking of candidate worms to the extent that these steps may be performed, for example, by a computer with relatively low memory and/or processing power, and/or may be performed in real time. However, this means that other image artefacts will be selected and tracked, and it is therefore preferable to select and track a greater number of candidate worms than the actual number of worms provided. In some embodiments, N may be greater than two times the number of worms provided on the translucent substrate, or within the field of view. In some embodiments, N may be greater than three times the number of worms provided on the translucent substrate, or within the field of view.

In some embodiments, the method may further comprise:
for each selected nth block of pixels of said first difference image:
  determining a value of a metric relating to image quality of said nth block of pixels;
  determining whether said nth block of pixels includes an image of a worm based on a comparison of the determined value of said metric with a predetermined value.

The metric used for determining whether said nth block of pixels of the first difference image (i.e. the nth candidate worm subimage) actually includes a worm, may be derived, for example, from one or more of: pixel variance, power spectral density analysis, thresholded intensity sum, thresholded ellipticity, image sharpness, image contrast, K-means clustering analysis, and/or artificial neural networks.

A method according to any of the preceding claims, wherein:
said first and subsequent images are obtained using an image sensor controlled by a first computing device;
wherein at least steps (ii) to (v) are performed by said first computing device.

Said first computing device may be a computer, e.g. a single-board computer, directly controlling an image sensor, or controlling a camera comprising the image sensor. Alternatively, said first computing device may comprise a computer, e.g. a single-board computer, and a camera comprising the image sensor, with steps (ii) to (v) being shared between the camera and computer. Said first computing device may be comprised within a networked camera with integrated programmable processing.

In some embodiments, at least steps (ii) to (vi) are performed by said first computing device.

In some embodiments, for each selected nth block of pixels of said first difference image, data comprising said nth block of pixels and/or said coordinate associated with said nth block of pixels is transmitted from said first computing device to a second computing device.

In some embodiments: said step of determining a value of a metric and said step of determining whether said nth block of pixels includes an image of a worm are performed by said second computing device.

The second computing device may have greater processing power, memory and storage than the first computing device. The second computing device may receive and process corresponding data from more than one said first computing device.

In some embodiments, for each of the M subsequent images, for each selected nth block of pixels of said mth difference image, data comprising said nth block of pixels and/or said coordinate associated with said nth block of pixels is transmitted from said first computing device to a second computing device.

The coordinates associated with the nth block of pixels of the first and M subsequent images represent the track of a candidate worm in the field of view. Thus the displacement of each worm may be determined. The nth block of pixels of each of the first and M subsequent images represent sub-images of the nth candidate worm and may be used to determine other types of movement of the candidate worm, e.g. wriggling movements. Although determination of whether an nth candidate worm is actually a worm may be carried out using only the nth block of pixels of the first image, the nth block of pixels of the M subsequent images may also be used to check that a worm has been correctly tracked. For example, worms may coincide in a single sub-image or cross tracks, making analysis more difficult. Such candidates may be rejected during analysis.

Said plurality of nematode worms may comprise *Caenorhabditis elegans*.

According to a second aspect of the invention, there is provided an apparatus for tracking movement of nematode worms, the apparatus comprising:
a receiving area for receiving a plurality of worms on a translucent substrate;
an image sensor for imaging a field of view including the plurality of worms;
an illumination source, for illuminating the plurality of worms, wherein the illumination source and image sensor are positioned on opposite sides of the receiving area; and
a first computing device for controlling said image sensor, said first computing device being configured for:
  obtaining a first image of a field of view including the plurality of worms by transmission imaging;
  obtaining a first difference image of the plurality of worms corresponding to an intensity difference between said first image and a background image of the field of view;
  repeating the following steps (a) to (d) a plurality of N times, for n=1 to N:
    (a) determining, from the first difference image, an nth pixel corresponding to a maximum intensity difference;
    (b) selecting, from the first difference image, an nth block of pixels comprising the selected nth pixel;
    (c) determining a coordinate associated with the selected nth block of pixels; and
    (d) updating said first difference image by setting each pixel of said nth block of pixels in said first difference image to a value corresponding to a zero or low intensity difference;
  obtaining a sequence of M subsequent images of the field of view by transmission imaging; and
  repeating the following steps (f) and (g) for each of the M subsequent images, for m=2 to m=M+1:

(f) obtaining an mth difference image of the plurality of worms corresponding to an intensity difference between the mth subsequent image and said background image; and (g) repeating the following steps a plurality of N times, for n=1 to n=N:
  determining, from the mth difference image, an nth pixel corresponding to a maximum intensity difference or a centre-mass of the intensity difference distribution of a trial block of pixels positioned at the determined coordinate associated with the corresponding nth selected block of pixels of the (m−1)th difference image;
  selecting an nth block of pixels of said mth difference image, said nth block of pixels comprising the determined nth pixel; and
  determining a coordinate associated with the selected nth block of pixels of said mth difference image.

The apparatus may further comprise a second computing device, configured for:
receiving data from said first computing device, said data comprising, for each selected nth block of pixels of said first difference image, said selected nth block of pixels; and
for each selected nth block of pixels of said first difference image:
  determining a value of a metric relating to image quality of said nth block of pixels;
  determining whether said nth block of pixels includes an image of a worm based on a comparison of the determined value of said metric with a predetermined value.

Said data may further comprise, for each selected nth block of pixels of said first difference image, data comprising said coordinate associated with said nth block of pixels.

Said data may further comprise, for each of said M subsequent images: for each selected nth block of pixels of said mth difference image, data comprising said coordinate associated with said nth block of pixels.

Said further data may further comprise, for each of the M subsequent images: for each selected nth block of pixels of said mth difference image, data comprising said nth block of pixels.

According to a third aspect of the invention, there is provided a system for tracking movement of nematode worms, the system comprising:
  a plurality of apparatuses as defined above, and
  a second computing device, configured for receiving and processing data from the respective first computing devices of said plurality of apparatuses.

BRIEF DESCRIPTION OF THE DRAWINGS

A preferred embodiment of the present invention will now be described, by way of example only and not in any limitative sense, with reference to the accompanying drawings, in which.

DETAILED DESCRIPTION OF EMBODIMENTS

Figure 1:
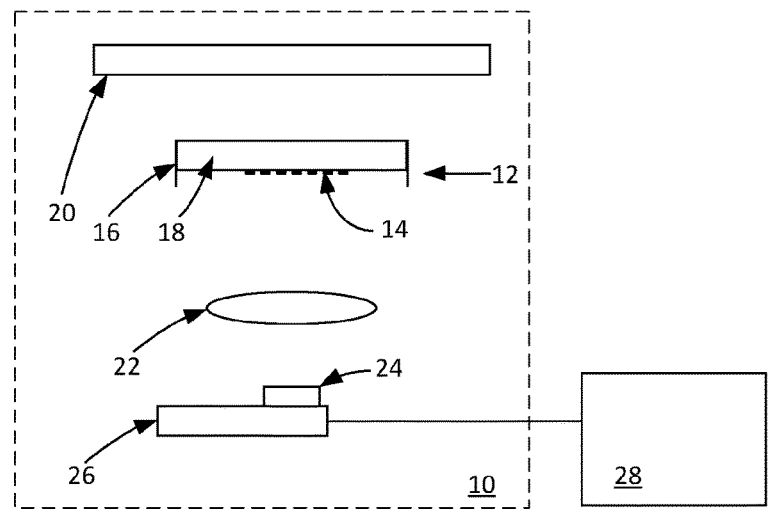
FIG. 1 is a schematic representation of an apparatus according to an embodiment of the invention.
Figure 2:
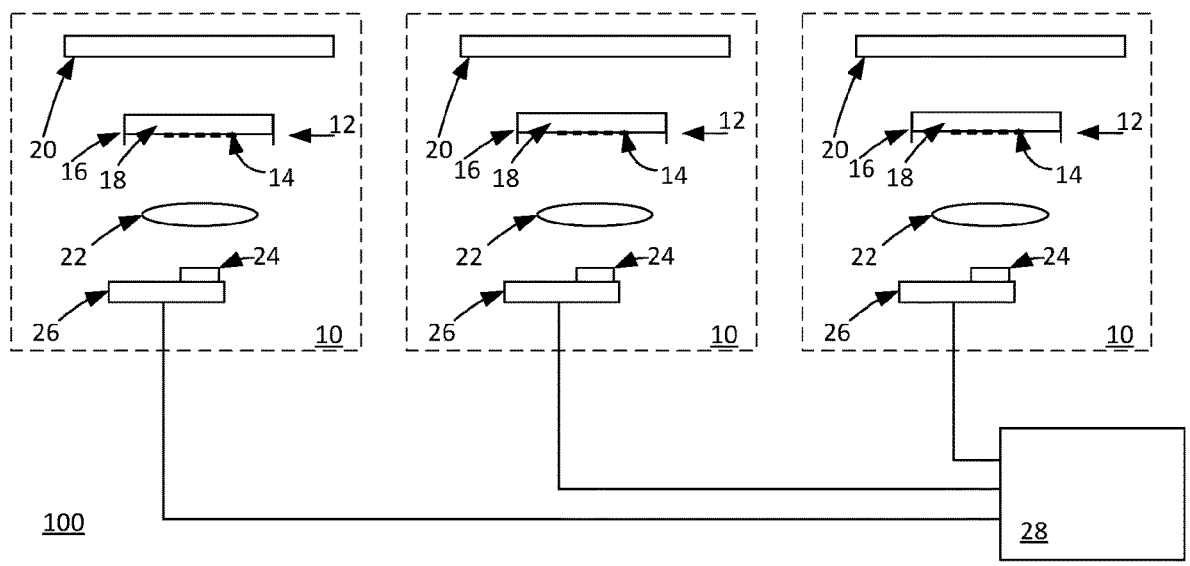
FIG. 2 is a schematic representation of a system according to an embodiment of the invention.

With reference to FIGS. 1 and 2, an apparatus 10 according to the present invention for tracking movement of nematode worms comprises a receiving area 12 for receiving a plurality of worms 14 on a translucent substrate 16, 18, a light source 20 for illuminating the plurality of worms 14, a lens 22, an image sensor 24 for imaging a field of view including the plurality of worms 14, and a first computing device 26 for controlling the image sensor 24 and processing data from the image sensor. The lens 22 is positioned for imaging the worms 14 onto the image sensor 24. The light source 20 and image sensor 24 are positioned on opposite sides of the receiving area 12 so that the worms may be imaged by transmission imaging using light from the light source 20.

The worms 14, in the form of Caenorhabditis elegans, are provided on the translucent substrate 16, 18, which is in the form of a petri dish 16 (e.g. a 63 mm diameter plastic petri dish) containing a 6 mm deep layer agar gel 18. A petri dish 16 may be provided with a lid. Typically, around 80 worms may be provided on a single substrate 16, 18, although the number may vary, for example between 50 and 110. The agar gel includes a bacterial 'lawn' which provides food for the worms 14. The skilled person will appreciate that other substrates may be used, for example agarose gel. In some embodiments, the substrate may be transparent.

The light source 20 is a diffuse LED light source having a size of approximately 210 mm by 297 mm and is positioned parallel to and approximately 200 mm above the receiving area 12. By using a large, diffuse light source 20 positioned close to the worms 14, rather than a high-quality optical system, the size and expense of the system 100 may be reduced. However, this means that spatial non-uniformities in the illumination of the worms 14 may be apparent in the images obtained from the image sensor 24. Nonetheless, the method of the present invention is able to tolerate such non-uniformities in the illumination.

The image sensor 24 and first computing device 26 are provided by a Raspberry Pi computer Model B V3 including a Raspberry Pi camera module V2. The image sensor 24, included in the camera module, is an 8 megapixel CMOS image sensor (e.g. Sony IMX219). The 8 megapixel Red-Green-Green-Blue raw Bayer array data from the image sensor 24 is binned 2×2 into 2 megapixel greyscale images for processing. The lens 22 is a standard lens with 3.06 mm focal length and F/2 aperture and is located approximately 170 mm below the petri dish 16. The first computing device 26 processes data from the image sensor 24, effectively compressing the data for export to a remote second computing device 28. The skilled person will appreciate that other types of first computing device 26 may be used. For example, the image sensor 24 and first computing device 26 may be combined in a networked camera with integrated programmable processing.

With reference to FIG. 2, the apparatus 10 is part of a system 100 comprising multiple apparatuses 10 and the second computing device 28, wherein the first computing device 26 of each apparatus 10 is in communication with the second computing device 28. In this system 100, multiple pluralities of worms 14 are monitored using respective apparatuses 10. FIG. 2 shows a system 100 comprising three apparatuses 10, but this may be extended to include tens or hundreds of apparatuses 10.

The first computing device 26 is configured to control the image sensor 24 for obtaining images of a field of view 30 including the plurality of worms 14 by transmission imaging. To monitor movement of the worms, a sequence of images of the field of view are taken over a period of time. In one embodiment, 200 images are taken at regular intervals over a 160 second period (i.e. at 0.8 second intervals). Individual worms can be tracked through these 200 images as will be described below, enabling movement of the worms to be quantified. This can be repeated at intervals (e.g. hourly or daily) to monitor changes in the movement or activity of the worms over a period of several days or weeks. The skilled person will appreciate that the time interval between images may take a different value, for example in the range 0.1 seconds to 1 second.

Figure 3:
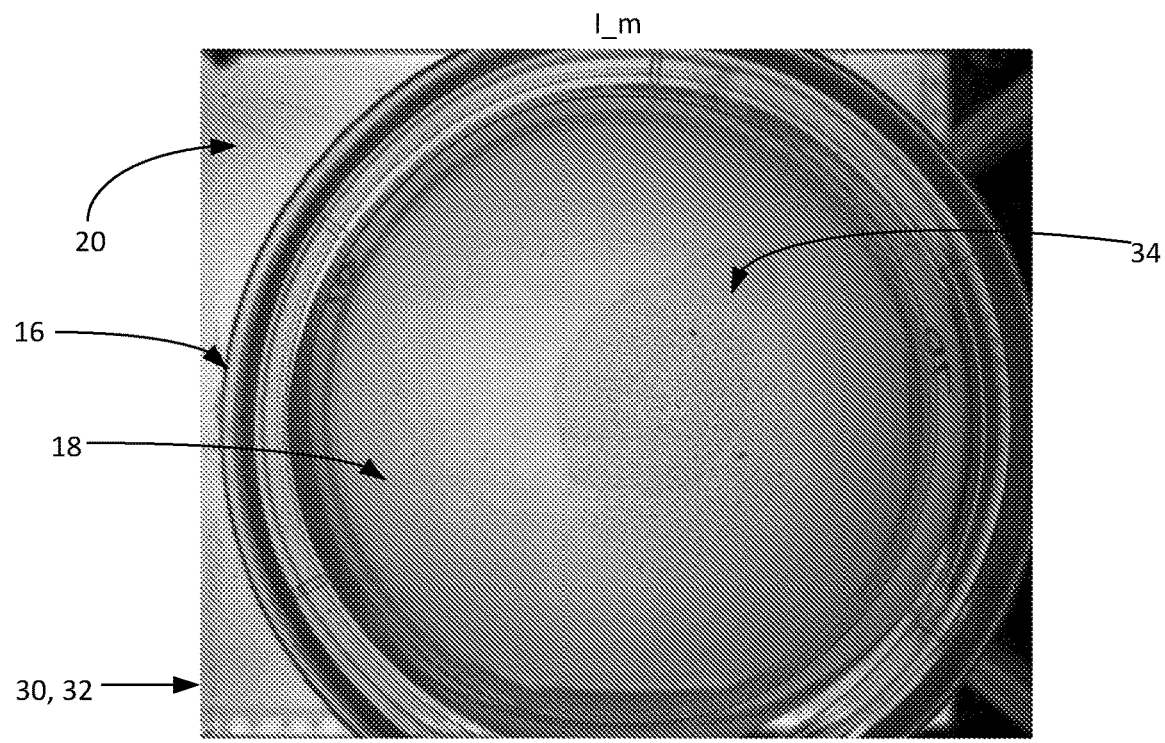
FIG. 3 shows an example transmission image obtained using the apparatus of FIG. 1.

An example grayscale transmission image 32 is shown in FIG. 3 and captures most of the petri dish 16 and agar gel layer 18. Parts of the light source 20 are also visible. Also visible in the image 32 is a bacterial 'lawn' 34 on the agar gel 18, appearing as a central darker region with an even darker border. The image 32 also includes some droplets of condensation (although most images would be expected to be free of these) and bits of darker detritus.

The images also suffer from shot noise, due to a low photon count per pixel per image resulting from low-intensity illumination and small pixel size.

The worms 14 have a length of approximately 1 mm and a diameter of approximately 0.1 mm. In a transmission image, such as that shown in FIG. 3, the worms reduce the intensity of the background light and therefore appear in the image 32 as dark objects. However, the worms are low-contrast and are therefore barely distinguishable from the noise in the transmission image (bacterial lawn, detritus, condensation, illumination non-uniformities, shot noise).

To track the worms, further processing of the images is required to improve the contrast of the worms. A background image of the field of view I_max is constructed from a plurality of images of the field of view (such as the image shown in FIG. 3), with the worms 14 in situ, obtained at intervals over a period of time long enough for the worms to have moved away from their initial positions. For some samples of worms, 3 to 4 seconds would be sufficient for most of the worms to have moved away from their initial position, but longer timescales may be required for slower worms, for example, from a minute to over an hour. In this embodiment, the background image is constructed using the same images as are used to track the worms, i.e. the 200 images taken over a 160 second period. The worms move around during this period, but all other objects in the field of view remain stationary. The background image, I_max, is a 'maximum intensity projection', in which each pixel is assigned a value representative of the highest intensity values of the corresponding pixels having the same position in the 200 images. Thus the background image I_max shows what each pixel looks like in the absence of a worm, that is, an idealised 'worm-free' image. All other (non-worm) dark structures remain in this image. In particular, the I_max projection uses the mean value of the 10 brightest of the corresponding pixels, excluding the absolute brightest one. Averaging over 10 pixel values reduces noise, while excluding the absolute brightest pixel may help to avoid effects such as occasional sensor glitches from the camera module or image sensor 24. Occasionally, worms may appear to be visible with reduced contrast in the I_max background image: this is a statistical artefact, due to the fact that, in regions where a worm has been, there are fewer images available 'worm-free' to contribute to the maximum intensity projection. Due to the noise on the light from the light source 20 and the noise on the sensor 24 being statistical, the probability of getting bright noise is reduced, making the I_max projection darker in regions where the worms have been.

In other embodiments, the background image may be constructed differently, for example by assigning each pixel of the background image the highest intensity value of the pixels having the same position in the plurality of images. Alternatively, a background image may be obtained prior to the sequence of 200 images, either with the worms in situ as described above, or without the worms present.

A difference image, I_max–I_m, corresponds to an intensity difference between a single transmission image I_m (e.g. the image 32 of FIG. 3) and the background image I_max. Ideally, this results in a difference image in which all static objects have been subtracted, leaving only the worms visible. In practice, other structures appear in the image with very low contrast due to the statistical nature of the noise source and its relationship to the light intensity.

Figure 4:
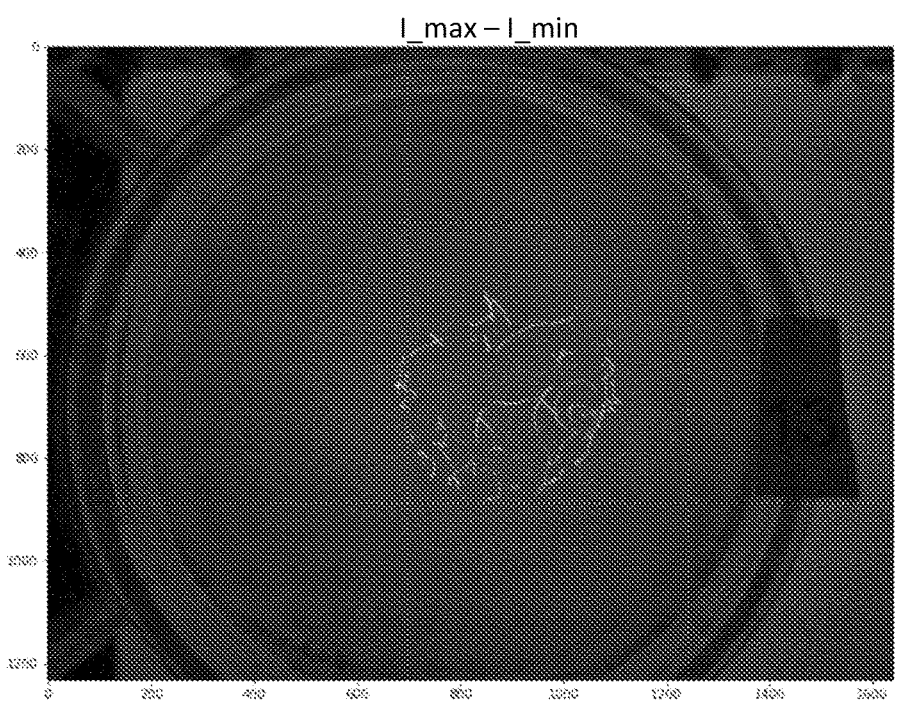
FIG. 4 shows an example image corresponding to a difference I_max−I_min between maximum and minimum intensity projections.

Usefully, a 'minimum intensity projection' I_min may also be constructed, using the same plurality of images used for the background image I_max. In the 'minimum intensity projection' I_min, each pixel takes a value representative of the minimum intensity values recorded for the corresponding pixel over the 200 images. Thus the background image I_min shows everywhere the darker worms have been. In particular, the I_max projection uses the mean value of the 10 darkest pixels, excluding the absolute darkest pixel. This reduces noise and avoids occasional sensor glitches from the camera module or image sensor 24. Subtracting the two projections to give I_max–I_min gives a useful visualisation of all the worm track. FIG. 4 shows an example I_max–I_min constructed from a real set of 200 images taken over a 160 second period. However, these images are difficult to process for quantitative statistics due to noise.

Figure 5A:
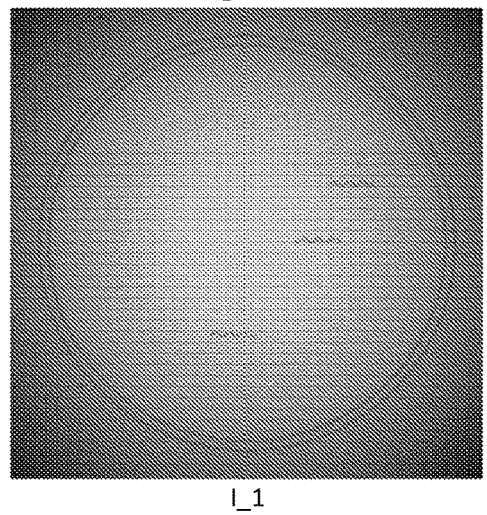
FIGS. 5A to 5E show images generated from a simulation of the apparatus of FIG. 1.
Figure 5B:
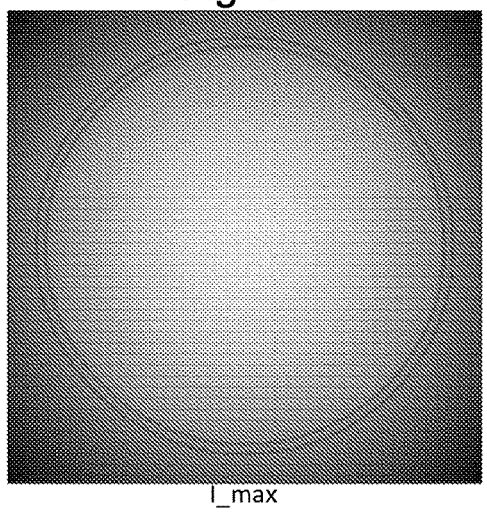
Figure 5C:
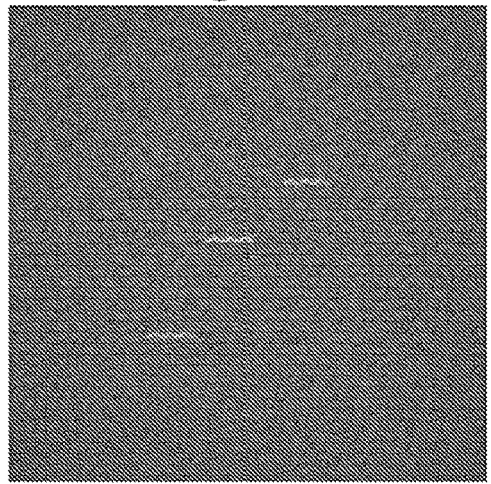
Figure 5D:
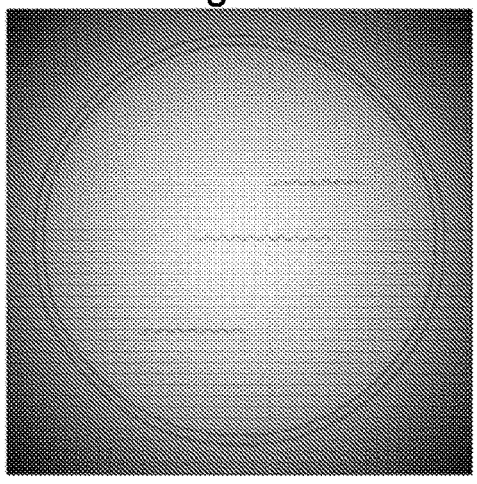
Figure 5E:
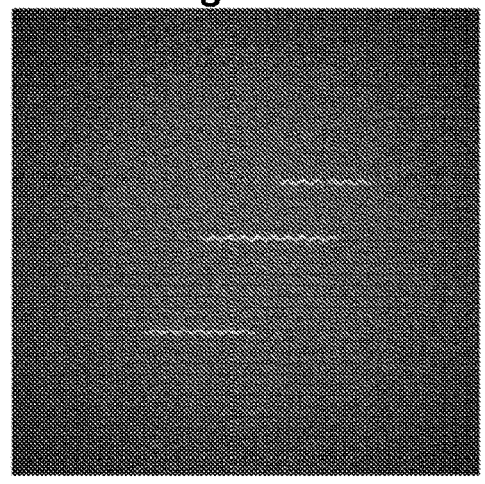

To illustrate the maximum and minimum projections I_max, I_min, described above, FIG. 5 shows results of a simulation based on a sample of three worms. For the purposes of the simulation, the size of the worms is much greater than (approximately 10 times) the size of the real worms. FIG. 5A shows a simulation of a single transmission image I_1, in which the worms appear as dark objects against the bright transmitted illumination. FIG. 5B shows a simulation of the maximum intensity projection I_max based on 200 simulated transmission images at 0.8 second intervals. In the simulation, the stationery dark structures include only the edge of the petri dish. In this simulation, the I_max projection uses the mean value of the 10 brightest pixels, excluding the absolute brightest pixel (i.e. the $2^{nd}$ to $11^{th}$ brightest of the corresponding pixels of the 200 images). FIG. 5C shows a difference image I_max–I_1, in which the worms appear as high-contrast bright objects. FIG. 5D shows a simulation of the minimum intensity projection I_min based on the 200 simulated transmission images, the dark 'tracks' showing everywhere the worms have been observed in the 200 images. In this simulation, the I_min projection uses the mean value of the 10 darkest pixels, excluding the absolute brightest pixel (i.e. the $2^{nd}$ to $11^{th}$ darkest of the corresponding pixels of the 200 images). FIG. 5E shows the difference between the maximum and minimum projections, I_max−I_min, for the simulation, the bright 'tracks' showing everywhere the worms have been. Processing of the 200 images by the first computer 26 to generate the maximum projection I_max and the minimum projection I_min, takes about a minute using a Raspberry Pi.

Once the background image of the field of view, I_max, has been constructed, the sequence of 200 images I_m are processed to generate 200 corresponding difference images I_max−I_m, where m takes values from 1 to 200.

A first difference image, I_max−I_1, corresponding to the difference between the background image I_max and a first transmission image I_1, is used to select 'subimages' of 'candidate' worms which are to be tracked through the images. In this embodiment, the first difference image I_1 corresponds to an average over two or more transmission images, in particular to an average over the first three transmission images of the sequence of 200 images obtained at 0.8 second intervals. In other embodiments, the first difference image may simply correspond to the first transmission image of the sequence. Using the first difference image, a plurality of N candidate worm subimages are selected from for tracking. Selection of the candidate worm subimages from the first difference image (i.e. 'segmentation' of the first difference image) is carried out by the following sequence of steps for n=1 to N:

(a) determine an nth pixel corresponding to a maximum intensity difference, that is, the brightest pixel of the first difference image I_max−I_1;

(b) measure a thresholded centre-of-mass of the intensity difference distribution of an initial 24×24 block of pixels centred on the nth brightest pixel, then select an nth 24×24 block of pixels centred to within 1 pixel of the measured centre-of-mass;

(c) determine a coordinate associated with the selected nth block of pixels (e.g. the image coordinate of the pixel closest to the measured centre-of-mass); and (d) update said first difference image I_max−I_1 by setting the value of each pixel of said nth block of pixels to zero.

By repeating steps (a) to (d) a total of N times, finding the brightest pixel of the first difference image each time, a total of N blocks of pixels or 'sub-images' are selected, each one identified by a respective coordinate. In this embodiment, each of the N selected blocks of pixels is centred on a measured centre-of-mass of the intensity difference distribution of an initial 24×24 block of pixels centred on the nth brightest pixel. This helps to ensure that each of the N selected blocks of pixels are reasonably well positioned over its respective candidate worm. However, the skilled person will appreciate that there are other methods for centring the selected blocks of pixels on the candidate worms. For example, each of the N selected blocks of pixels may be centred on the centre of a Gaussian, polynomial, or other function fitted to the intensity difference distribution of the initial 24×24 block of pixels.

In this embodiment, the size of each selected nth block of pixels is the same for all n, i.e. 24×24 pixels. In the field of view, this corresponds to approximately 1.8 mm×1.8 mm. This is typically large enough to include a whole worm, although occasionally some worms may extend out of the block of pixels. Larger blocks of pixels may be used, for example up to 3 mm×3 mm in the field of view. However, increasing the size of the blocks of pixels may increase the likelihood of a block covering two or more worms. In other embodiments, the dimensions of the nth block of pixels may be set adaptively, e.g. based on a width of the intensity difference distribution around the nth brightest pixel. The skilled person will also appreciate that blocks of pixels having other shapes may be used.

Each nth block of pixels corresponds to a candidate worm sub-image. With real image data, the simple "find the brightest pixel" method of identifying candidate worms, described above, is not sufficient to reliably detect only actual worms. Therefore, many of the 'candidate worms' will actually be image artefacts other than worms. However, in the present invention, all the 'candidate worms' are tracked through the sequence of 200 images, as described below, without determining which of the candidates are actually worms. As a result, it is necessary to select and track a greater number of candidate worms than the number of actual real worms 14 provided on the translucent substrate 16, 18. For the embodiment described here, a value of N of about 2.2 times the number of worms was used. It has been found that values of N down to around 1.5 may be sufficient to track most or all of the worms. However, this may vary depending on factors such as image quality. Larger values of N (for example, between two and three times the number of worms, or at least three times the number of worms) may help to increase the fraction of the worms that are tracked.

Each 'candidate worm' selected from the first difference image is tracked through the remaining 197 difference images I_max−I_m (for m=2 to 198) obtained from the sequence of 200 images (the first three images of the sequence were averaged to create the first difference image) by recentering its associated block of pixels using thresholded centre-of-mass measurements. Tracking of the candidate worms, selected based on the first difference images, through the rest of the sequence of 200 images, is carried out by repeating the following for each of the sequence of M=197 subsequent images, i.e. for m=2 to m=198:

for each of the candidate worm subimages, i.e. for n=1 to n=N:

(i) measure a thresholded centre-of-mass of the intensity difference distribution in a trial 24×24 block of pixels of the mth difference image, the trial 24×24 block of pixels being centred on the coordinate associated with the corresponding selected nth block of pixels of the (m−1)th difference image, and determine an nth pixel closest to the measured thresholded centre-of-mass;

(ii) select an nth 24×24 block of pixels of the mth difference image, centred on the determined nth pixel (i.e. the pixel closest to the measured centre-of-mass of the trial block of pixels)

(iii) determine a coordinate associated with the selected nth block of pixels of said mth difference image (e.g. the image coordinate of the nth pixel closest to the measured centre-of-mass).

By repeating steps (i) to (iii) for each of the N candidate worms, for each of the M subsequent images, effectively finding the new centre-of-mass of the intensity difference for each nth block of pixels corresponding to the nth candidate worm and recentering the nth block of pixels accordingly, each candidate worm is tracked through the sequence of images. The coordinates associated with each of the N candidate worms in each of the M images provides a record of the position of the candidate worm as a function of time. In other embodiments, the trial block of pixels may be larger than the corresponding nth selected block of pixels. This may be useful if the worms are likely to have moved significantly between successive images.

In this embodiment, the N selected blocks of pixels of the mth difference image, are effectively centred on the centre-of-mass of the intensity difference distribution of the trial block of pixels. This helps to ensure that each of the N selected blocks of pixels are reasonably well re-centred on the respective candidate worm for each of the M subsequent images. However, the skilled person will appreciate that there are other methods may be used. For example, each of the N selected blocks of pixels may be centred on the centre of a Gaussian or polynomial function fitted to the intensity difference distribution of the trial block of pixels.

Figure 6:
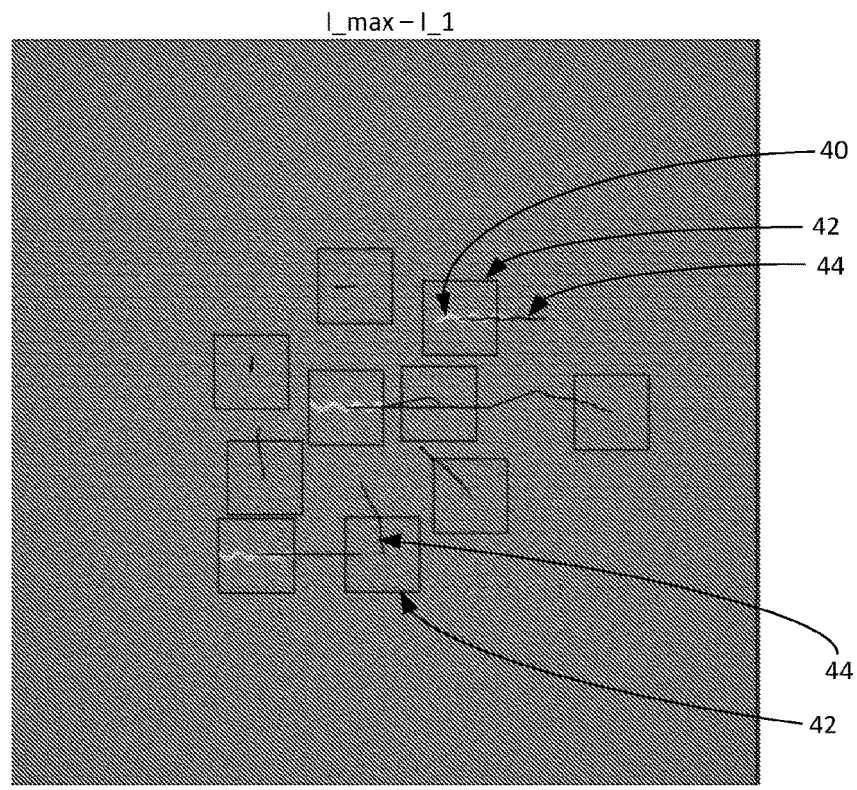
FIG. 6 illustrates the results of imaging, selecting and tracking candidate worms in the simulation using a method according to an embodiment of the invention.

FIG. 6 shows the results of selecting and tracking candidate worms based on the simulation including three worms. The image shown in FIG. 6 corresponds to that of FIG. 5, i.e. the first difference image, I_max−I_1, where I_1 corresponds to an average over the first three transmission images of the sequence of 200 simulated images. The simulated worms appear in the image as bright wiggly lines 40. Superimposed on the image are boxes 42 indicating the boundaries of the selected 24×24 blocks of pixels, or candidate worm subimages, segmented from the first difference image as described above. In this example, ten blocks 42 of pixels are selected, i.e. N=10. As explained above, it is necessary to select more candidate worms than the number of actual worms in order to ensure that all the worms are tracked, so N is chosen to be around three times the number of worms in the simulation. Thus three of the boxes 42 include worms; the other seven boxes 42 do not. All ten candidate worms are tracked as described above, through the 197 subsequent images of the sequence of images. 'Tracks' 44, indicating the centre-of-mass coordinate of each candidate worm subimage through the sequence of subsequent images, are shown superimposed on the image as relatively thin black lines starting from the centre of each respective box 42. As a useful check, it can be seen that the tracks 44 corresponding to the three simulated worms overlap the bright paths on the image of FIG. 5E showing 'everywhere the worms have been'.

The above processing of the images may be carried out at the first computing device 26. Thus, the selection of candidate worms and tracking of those candidate worms through the sequence of 200 images may be carried out without transmitting large data sets to a different computing device.

The first computing device 26 may then output data to the second computing device 28, for further processing, in particular for the more complex task of determining which of the candidate worms are actually worms. The data output by the first computing device 26 to the second computing device 28 may include the N 24×24 blocks of pixels selected from the first difference image, i.e. the subimages of the candidate worms, together with their coordinates, and the coordinates of the tracked candidate worms in each of the subsequent images. The data may also include the N 24×24 blocks of pixels selected from each of the M subsequent difference image if required for further checks or analysis. In this way, each of the original difference images has been effectively compressed, by selecting out only the N blocks of pixels of interest. For example, selection of 100 candidate 24×24 blocks of pixels from a 2 megapixel image represents a compression factor of more than 30. However, there is no loss of data in these regions of interest. Higher compression factors are obtained when it is not necessary to export the corresponding N subimages selected from the M subsequent difference images, only the respective coordinates.

The second computing device 28 carries out the task of determining which of the candidate worms are actually worms, by further processing of the N 24×24 blocks of pixels selected from the first difference image, i.e. the N candidate worm subimages. This is done by determining a value of a specified 'metric' relating to image quality for each candidate worm subimage. Each candidate is classified as 'worm' or 'non-worm based on a comparison of the determined metric with a predetermined value or values. Suitable metrics include image sharpness and image contrast, using their common definitions. Other metrics may be determined based on K-mean clustering analysis and artificial neural networks.

Figure 7A:
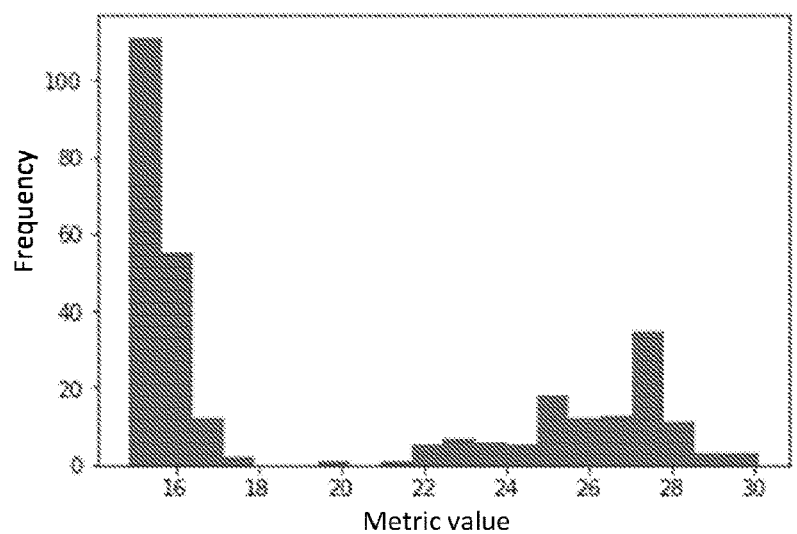
FIG. 7A is a histogram of the values of a metric determined for candidate worms in the simulation.
Figure 7B:
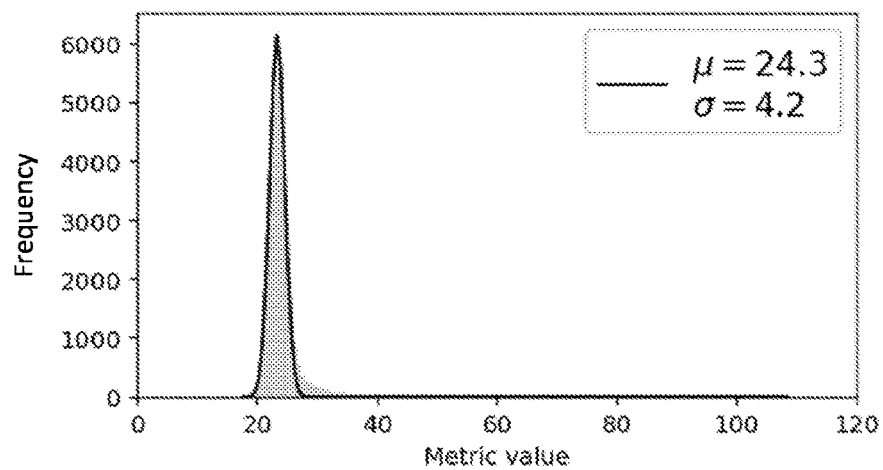
FIGS. 7B and 7C are histograms of the values of the metric based on real images of worms obtained at late and early times respectively.
Figure 7C:
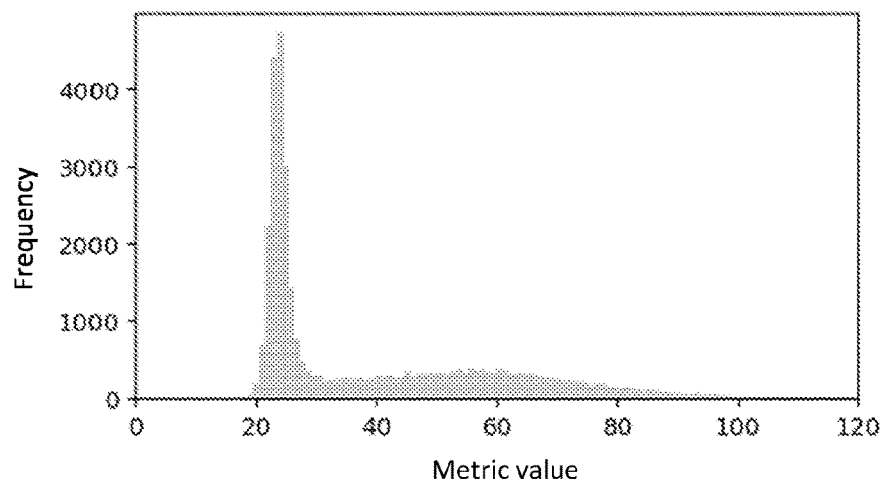

FIG. 7A is a histogram of the metric values measured for each of the N subimages of each of the 200 images of the simulated image sequence. In this embodiment, the standard deviation of pixel intensity values was used as the metric. The histogram shows that the distribution of values of the metric is a sort of bimodal distribution, having a 'noise' or 'non-worm' peak at low values, corresponding to candidate images that are not worms, and a 'worms' peak at higher values corresponding to candidate images that are indeed worms. FIGS. 7B and 7C are similar histograms based on real data, using many hundreds of 200-image sequences. FIG. 7B is a histogram of values of the metric for image sequences obtained at late times, when the worms are no longer moving. For late times, data falls entirely within the 'noise' or 'non-worm' peak at low values. A Gaussian fit may be made to the 'noise' peak to measure the mean and standard deviation of the metric value for non-worm candidate subimages. FIG. 7C is a histogram of values of the metric for image sequences obtained at early times with a lot of moving worms present. The data shows both a 'noise' peak at low values (corresponding to candidates which are not worms) and a much broader 'worm' peak at higher values, and which only slightly overlaps the 'noise' peak. By quantifying the distributions of the values of the metric, it is therefore possible to determine whether a candidate worm subimage falls within the 'noise' or 'worm' peak based on the value of the metric for that candidate worm subimage, and thus to classify each candidate as 'worm' or 'non-worm'. The 'non-worm' candidate subimages may then be discarded from further analysis.

Figure 8:
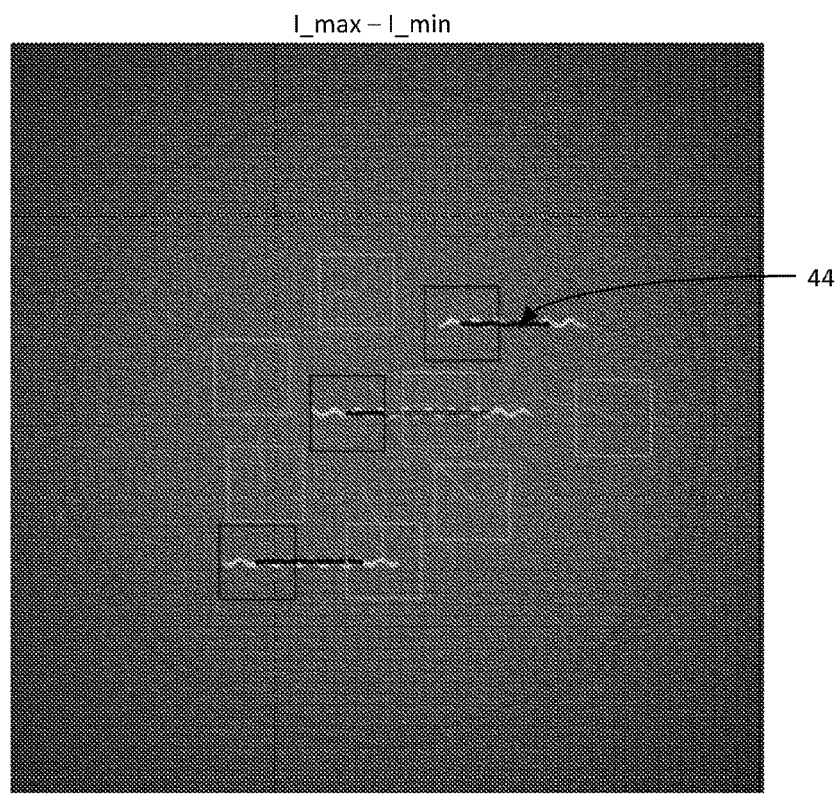
FIG. 8 illustrates results of classification of candidate worms in the simulation.

FIG. 8 shows the results of the simulation for the classification of the candidate worms (i.e. the blocks of pixels bounded by the boxes 42 in the first difference image shown in FIG. 6) as 'worm' or 'non-worm'. The image shown in FIG. 8 corresponds to that shown in FIG. 5E, i.e. the difference between the maximum and minimum projections, I_max−I_min. The bright wiggly paths show everywhere the worms have been at any time during the 160 second period over which the sequence of images was obtained. The black boxes indicate the boundaries of the candidate sub-images classified as 'worm', and the white boxes indicate the boundaries of the candidate sub-images classified as 'non-worm'. It can be seen that the classification of the candidates into 'worm' and 'non-worm' is accurate. In addition, it can be seen that the tracks 44 (shown as black lines) of the candidate worms classified as 'worm' can be seen to lie over the worm paths of the I_max−I_min image. Note that the tracks 44 are not wiggly. This is because the analysis does not track a single point on a worm, but rather the centre-of-mass of the intensity difference signal, which is quite immune to the simulated slithering motion.

Figure 9:
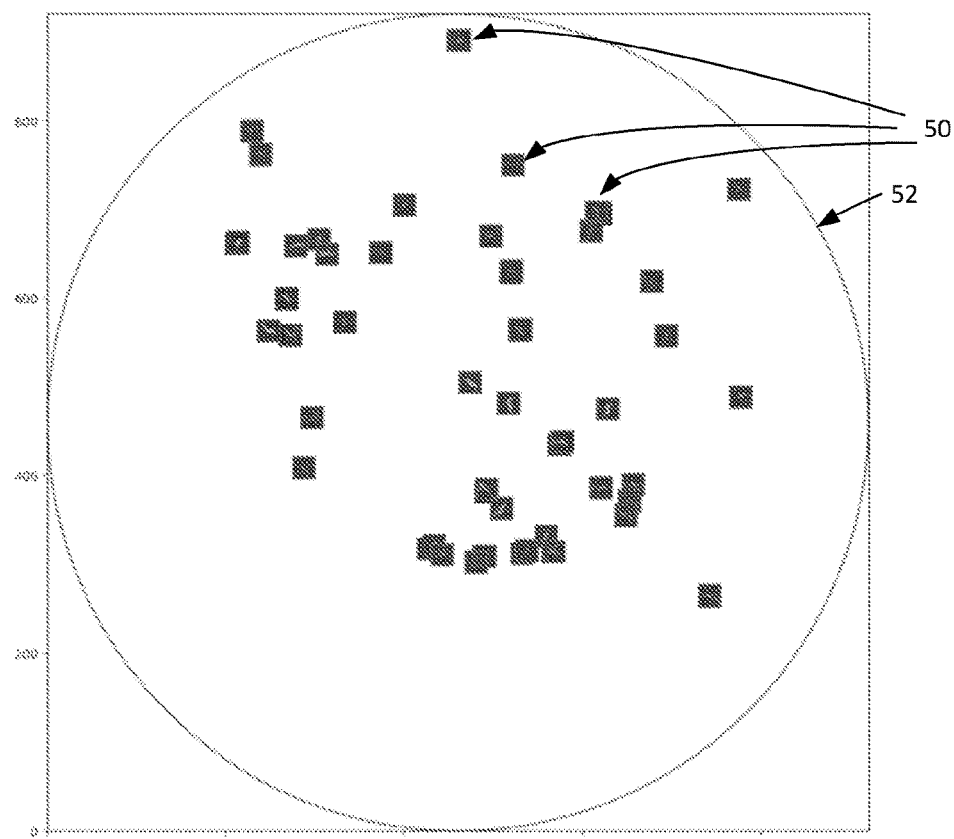
FIG. 9 shows a reconstructed image of the field of view including images of candidate worms selected and classified as worms.

FIG. 9 is based on real data, and is a reconstructed image of the field of view showing the selected candidate worm subimages 50 of the first difference image I_max−I_1, displayed according to their coordinates. The boundary of the petri dish is represented by the circle 52. The candidates rejected as 'non-worms' are not shown. A further round of rejection of candidates may be carried out. For example, if a worm is slightly larger than its 24×24 pixel block, a part of it may be excluded from the block and then selected as a further candidate worm during the segmentation process. These can be identified and rejected.

Figure 10:
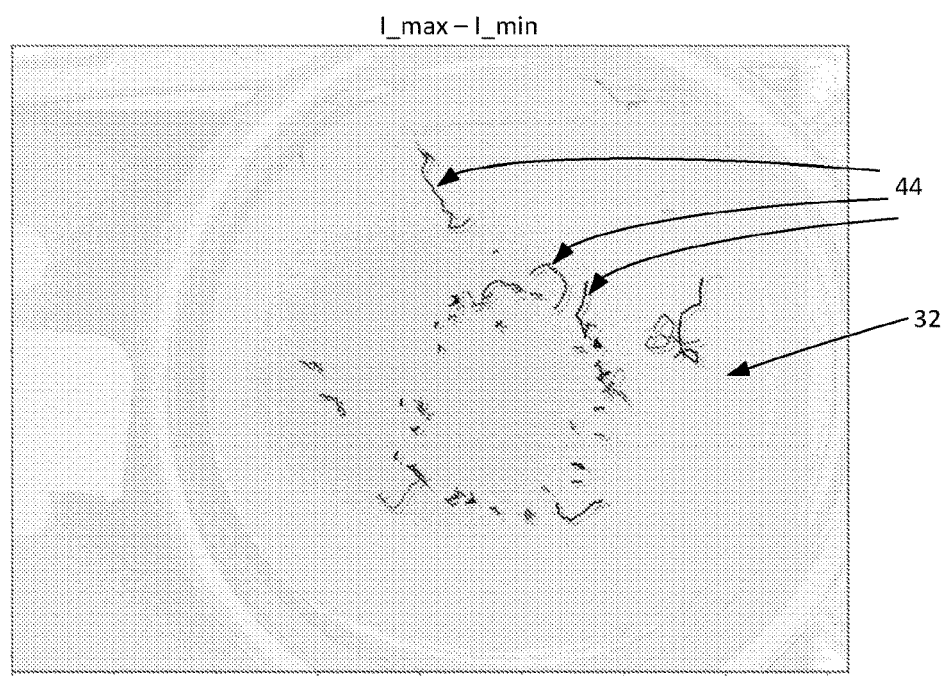
FIG. 10 illustrates the results of selecting, tracking and classifying candidate worms based on real images.

FIG. 10 is also based on real data, and shows an image corresponding to the difference between the maximum and minimum projections, I_max–I_min, inverted for clarity to show the worm paths as grey wiggly lines. Superimposed on the image are the tracks 44 of the worms, as determined by selecting and tracking candidate worms through a sequence of 200 images as described above, followed by metric-based rejection of the 'non-worm' candidates and rejection of overlapping tracks due to parts of the same worm being tracked as separate candidates. The tracks 44 are shown as black lines and have been slightly offset relative to the image to improve clarity. In the data set shown in FIG. 10, worms near the edge of the petri dish were not tracked due to problems with the illumination. A circle indicates the field of view 32 used for selection and tracking.

The method described above for processing the images to select and track candidate worms, and to classify the candidate worms as 'worm' or 'non-worm' is adapted for use in a distributed data processing system. Selection and tracking of candidates may be performed by the first computing device 26. This effectively compresses the data for transmission to the second computing device 28 for storage and/or classification of the candidate worms as 'worm' or 'non-worm'. The method and apparatus described above for selecting and tracking the candidate worms is sufficiently simple that the apparatus 10 may be replicated many times in a system 100, and across many systems 100, at relatively low expense and consuming a modest amount of space.

The skilled person will appreciate that various parameters used in the above embodiment may be varied according to data requirements, hardware specifications and/or experimental conditions. For example, the sequences of images may include different numbers of images, and/or different fixed or variable time intervals between successive images may be used.

In one embodiment, 600 sequential images are obtained as fast as possible (about 8 minutes), and are then processed by the first computing device 26 as three 200-image sequences. That is, I_max and I_min are projected for each sequence of 200 images, then each 200-image sequence is segmented and motion tracked using the first computing device 26. This gives three repetitions at effectively the same time, improving statistical analysis of the data.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A method for tracking movement of nematode worms, the method comprising:
   (i) providing a plurality of worms on a translucent substrate;
   (ii) obtaining a first image of a field of view including the plurality of worms by transmission imaging;
   (iii) obtaining a first difference image of the plurality of worms corresponding to an intensity difference between said first image and a background image of the field of view;
   (iv) repeating the following steps (a) to (d) a plurality of N times, for n=1 to N:
      (a) determining, from the first difference image, an nth pixel corresponding to a maximum intensity difference;
      (b) selecting, from the first difference image, an nth block of pixels comprising the selected nth pixel;
      (c) determining a coordinate associated with the selected nth block of pixels; and
      (d) updating said first difference image by setting each pixel of said nth block of pixels in said first difference image to a value corresponding to a zero or low intensity difference;
   (v) obtaining a sequence of M subsequent images of the field of view by transmission imaging; and
   (vi) repeating the following steps (f) and (g) for each of the M subsequent images, for m=2 to m=M+1:
      (f) obtaining an mth difference image of the plurality of worms corresponding to an intensity difference between the mth subsequent image and said background image; and
      (g) repeating the following steps a plurality of N times, for n=1 to n=N:
         determining, from the mth difference image, an nth pixel corresponding to a maximum intensity difference or a centre of the intensity difference distribution of a trial block of pixels positioned at the determined coordinate associated with the corresponding nth selected block of pixels of the (m−1)th difference image;
         selecting an nth block of pixels of said mth difference image, said nth block of pixels comprising the determined nth pixel; and
         determining a coordinate associated with the selected nth block of pixels of said mth difference image.

2. A method according to claim 1, wherein said background image is determined from a plurality of images of said field of view obtained by transmission imaging, wherein each pixel of said background image is assigned a value representative of the highest intensity values of the pixels having the same position in the plurality of images.

3. A method according to claim 2, wherein said plurality of images are obtained over a period of time longer than 4 seconds.

4. A method according to claim 2, wherein said plurality of images comprise at least some of said sequence of M subsequent images.

5. A method according to claim 1, wherein the step of selecting, from the first difference image, an nth block of pixels comprising the selected nth pixel, further comprises:
   determining a position of a centre of the intensity difference distribution of an initial block of pixels comprising said selected nth pixel;
   wherein said nth block of pixels is centred on the position of said centre of the intensity difference distribution of the initial block of pixels.

6. A method according to claim 1, wherein the nth block of pixels has a predetermined size which is the same for all n.

7. A method according to claim 6, wherein said predetermined size corresponds to less than 3 mm by 3 mm in the field of view.

8. A method according to claim 1, wherein said centre of the intensity difference distribution of said trial block of pixels is a centre-of-mass of the intensity difference distribution of said trial block of pixels, or a centre obtained by fitting a function to the intensity difference distribution of said trial block of pixels.

9. A method according to claim 1, wherein, in said step of determining, from the mth difference image, an nth pixel corresponding to a maximum intensity difference or said centre of the intensity difference distribution of a trial block of pixels positioned at the determined coordinate associated with the corresponding nth selected block of pixels of the (m−1)th difference image,
said trial block of pixels has the same or greater dimensions as the corresponding nth selected block of pixels of the (m−1)th difference image.

10. A method according to claim 1, wherein, in said step of selecting an nth block of pixels of the mth difference image, said nth block of pixels of said mth difference image is centred on said nth pixel corresponding to said maximum intensity difference or said centre of the intensity difference distribution of said trial block of pixels.

11. A method according to claim 1, wherein said M subsequent images are separated by a period of time of less than 1 second and/or greater than 0.1 seconds.

12. A method according to claim 1, wherein said first image corresponds to an average over two or more images of the field of view obtained by transmission imaging.

13. A method according to claim 1, wherein N is greater than two times the number of worms provided on the translucent substrate.

14. A method according to claim 1, further comprising:
for each selected nth block of pixels of said first difference image:
determining a value of a metric relating to image quality of said nth block of pixels;
determining whether said nth block of pixels includes an image of a worm based on a comparison of the determined value of said metric with a predetermined value.

15. A method according to claim 14, wherein:
said first and subsequent images are obtained using an image sensor controlled by a first computing device;
wherein at least steps (ii) to (v) are performed by said first computing device.

16. A method according to claim 14, wherein,
for each selected nth block of pixels of said first difference image, data comprising said nth block of pixels and/or said coordinate associated with said nth block of pixels is transmitted from said first computing device to a second computing device;
wherein said step of determining a value of a metric and said step of determining whether said nth block of pixels includes an image of a worm are performed by said second computing device.

17. A method according to claim 15, wherein, for each of the M subsequent images,
for each selected nth block of pixels of said mth difference image, data comprising said nth block of pixels and/or said coordinate associated with said nth block of pixels is transmitted from said first computing device to a second computing device.

18. An apparatus for tracking movement of nematode worms, the apparatus comprising:
a receiving area for receiving a plurality of worms on a translucent substrate;
an image sensor for imaging a field of view including the plurality of worms;
a light source, for illuminating the plurality of worms, wherein the light source and image sensor are positioned on opposite sides of the receiving area; and
a first computing device for controlling said image sensor, said first computing device being configured for:
obtaining a first image of a field of view including the plurality of worms by transmission imaging;
obtaining a first difference image of the plurality of worms corresponding to an intensity difference between said first image and a background image of the field of view;
repeating the following steps (a) to (d) a plurality of N times, for n=1 to N:
(a) determining, from the first difference image, an nth pixel corresponding to a maximum intensity difference;
(b) selecting, from the first difference image, an nth block of pixels comprising the selected nth pixel;
(c) determining a coordinate associated with the selected nth block of pixels; and
(d) updating said first difference image by setting each pixel of said nth block of pixels in said first difference image to a value corresponding to a zero or low intensity difference;
obtaining a sequence of M subsequent images of the field of view by transmission imaging; and
repeating the following steps (f) and (g) for each of the M subsequent images, for m=2 to m=M+1:
(f) obtaining an mth difference image of the plurality of worms corresponding to an intensity difference between the mth subsequent image and said background image; and
(g) repeating the following steps a plurality of N times, for n=1 to n=N:
determining, from the mth difference image, an nth pixel corresponding to a maximum intensity difference or a centre of the intensity difference distribution of a trial block of pixels positioned at the determined coordinate associated with the corresponding nth selected block of pixels of the (m−1)th difference image;
selecting an nth block of pixels of said mth difference image, said nth block of pixels comprising the determined nth pixel; and
determining a coordinate associated with the selected nth block of pixels of said mth difference image.

19. An apparatus according to claim 18, further comprising a second computing device, configured for:
receiving data from said first computing device, said data comprising, for each selected nth block of pixels of said first difference image, said selected nth block of pixels; and
for each selected nth block of pixels of said first difference image:
determining a value of a metric relating to image quality of said nth block of pixels; determining whether said nth block of pixels includes an image of a worm based on a comparison of the determined value of said metric with a predetermined value.

20. A system for tracking movement of nematode worms, the system comprising:
a plurality of apparatuses according to claim 18, and a second computing device, configured for receiving and processing data from the respective first computing devices of said plurality of apparatuses.

\* \* \* \* \*